Oct. 24, 1967

SATSURO UMEDA 3,348,303

METHOD OF MOUNTING A CENTER MAGNET WITHIN
A CYLINDRICAL METALLIC YOKE
Filed Feb. 25, 1963

A–A' SECTION

INVENTOR.
Satsuro Umeda
BY Wenderoth, Lind,
and Ponack
Attorneys

United States Patent Office 3,348,303
Patented Oct. 24, 1967

3,348,303
METHOD OF MOUNTING A CENTER MAGNET WITHIN A CYLINDRICAL METALLIC YOKE
Satsuro Umeda, 1215 Yoyogi Uehara-machi, Shibuya-ku, Tokyo, Japan
Filed Feb. 25, 1963, Ser. No. 260,419
6 Claims. (Cl. 29—606)

The present invention relates to an assembly of an instrument, and more particularly, to a novel and improved method for assembling and mounting electromagnetic elements to a yoke in the manufacture of a moving coil type electromagnetic instrument. In some cases, in a moving coil type center magnet instrument, there is widely adopted an assembly in which a centrally disposed magnet supported by a frame is mounted in a cylindrical yoke acting as the magnetic field. The center magnet is required to be centrally disposed by such means as soldering and screw fastening to the frame in which the moving coil is rotatably mounted in said magnetic field, and the frame should be accurately fastened to the yoke or a base which supports the yoke. However, in this method of assembling electromagnetic components, in order to keep deviation of the moving element containing magnet from the center of the yoke to minimum, a careful quality control should be carried out both in the production line for the parts and in the assembly line of the same. In reference to the oxide magnet, it is impossible to assemble it by means of such fastening means as soldering and screw fastening, because it is a sintered product. Therefore it is difficult to use it for the assembly of a specific instrument in which the oxide magnet will be used, since it has little impact resistance to withstand a shock sufficient to assemble it with a rather strong mechanical action.

The invention has as its object to overcome the above disadvantages encountered in the past, and briefly stated, a preferred embodiment of the invention comprises a novel and improved mounting method which consists of tightening and securing the frame supporting a center magnet within a mainly cylindrical yoke of a metallic material by taking advantage of its tendency to return to its initial shape inherent in the metal within the elastic limit thereof. In the firm fastening method according to this invention, such fastening means as soldering and screw-fastening as in the prior art is not required at all except for a temporary fastening.

It is, therefore, an object of the invention to provide a novel and improved method for mounting a magnet and a moving element of an electromagnetic instrument in a yoke.

It is another object of the present invention to provide a method which is capable of using ferrite magnet impossible with conventional fastening means due to the difficulties with soldering and screw fastening.

It is another object of the invention to provide a new and improved mounting method for such electric instruments by which the deviation of a magnet from the center of the yoke can be minimized.

It is still another object of the invention to provide a method for the assembly of instrument parts adapted for an efficient and economic mass production in which a frame is fastened to a yoke by taking advantage of the elasticity of the metal from which the yoke is made so as to obviate time consuming and rather tedious methods such as, soldering and screw fastening.

Numerous other objects and advantages of the invention will be apparent from the following description, which, taken in connection with the accompanying drawings, discloses a preferred embodiment thereof.

Figure 1:
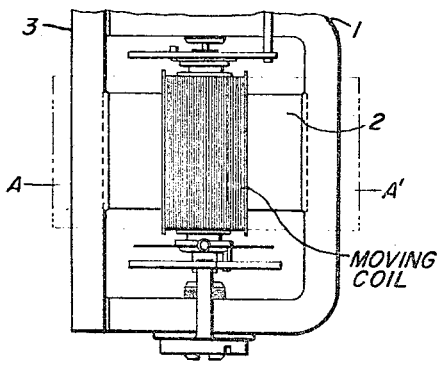
FIG. 1 is a side view showing a frame which supports a moving coil containing a center magnet, this view being prior to mounting it in a yoke of a cylindrical body.
Figure 2:
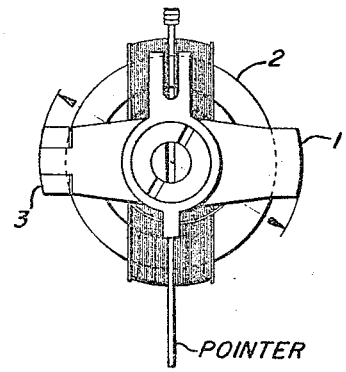
FIG. 2 is a top plan view of FIG. 1.
Figure 3:
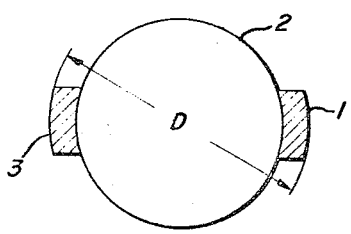
FIG. 3 is a sectional plan view taken along the line A–A' in FIG. 1.
Figure 4:
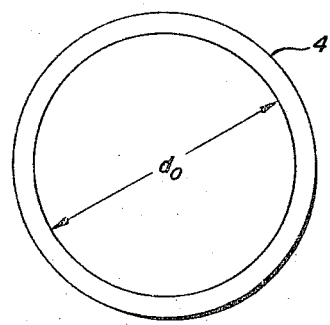
FIG. 4 is a top plan view of the yoke in its true circular state without any pressure on it.
Figure 5:
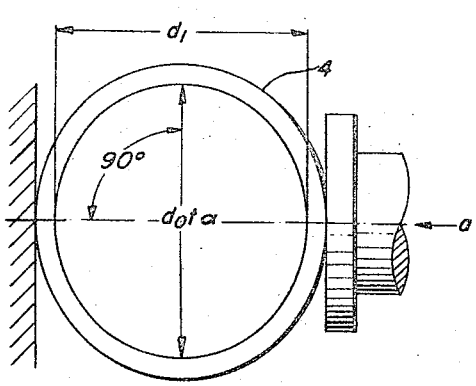
FIG. 5 is a plan view of a yoke in its deformed state resulting from the pressure exerted in a direction perpendicular to the cylindrical axis of yoke.

In the drawings, the auxiliary parts which form no part of the present invention are omitted for the sake of clarity and simplicity. Referring to the drawings in more detail, FIG. 1 is the side view showing one form of the invention in which the frame 1 which supports the magnet and moving element of an electromagnetic instrument is constructed in such manner that the backing-plate 3 is a separate piece from the frame 1, but is temporarily attached to it, before the frame is tightened by the yoke. FIG. 2 is a top plan view of FIG. 1, and as clearly shown in FIG. 2, the above-mentioned frame 1 and backing plate 3 each have the outer surfaces thereof in cylindrical shape corresponding to the internal surface of the yoke, and the inside surfaces which clamp the magnet 2 therebetween are also cylindrical in form corresponding to the outer periphery of the magnet. FIG. 3 is a sectional view showing the connection between the frame 1, plate 3 and the magnet 2, the outer diameter being shown as D, and the width of the frame is sufficiently large to be firmly tightened by the yoke. FIG. 4 is a plan view of the cylindrical yoke 4, the purpose of which is to provide a magnetic field for the instrument, and this figure shows its true circular state, the inner diameter being expressed as $d_0$. Now, when the yoke 4 is deformed by the pressing force by means of a vise in the direction of the arrow $a$, it is deformed so that the diameter of the yoke in the direction of compression is reduced to $d_1$ while the other diameter at a right angle thereto increases to $d_0+\alpha$. This $\alpha$ is a desired increment. In reference to the material from which the yoke is made, it is chiefly of a pure iron, which has been hardened by press working. After numerous experiments, it has been found that the permanent distortion resulting from the above described appropriate deforming operation is qualitatively expressed as within about one-tenth of the deformation amount. Therefore, in case of a yoke having an elasticity shown by the expression, e.g., $\alpha/(d_0-d_1) \doteq 0.78$, it follows that when the force is released after the assembled part with the outer diameter D as shown in FIG. 2 has been inserted into the yoke 4 in its constricted state of FIG. 5, the frame 1, and piece 3 together with the magnet 2 are simultaneously tightened together to form them into a whole integral unit. By way of explanation and not limitation, the following example is described hereinbelow:

$$d_0 = 12.0 \text{ mm.}$$
$$d_1 = 11.85 \text{ mm.}$$
$$d_0 + \alpha = 12.12 \text{ mm.}$$
$$D = 12.1 \text{ mm.}$$
$$D - d_0 = 0.1 \text{ mm.}$$

Figure 6:
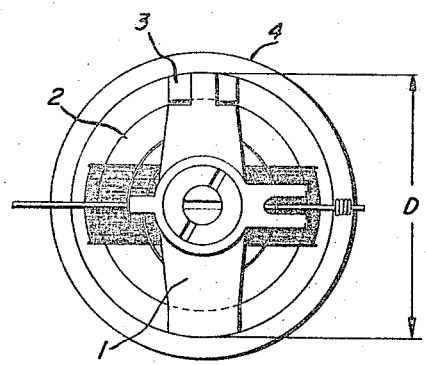
FIG. 6 is a top plan view of a finished assembly in which the yoke of FIG. 5 has returned to substantially its original form after the magnet, the frame with the moving element of FIG. 1 being inserted and tightened in it.

In the above case, a permanent distortion on the order of 0.012 mm. remains in the yoke made of pure iron owing to the compression by the vise. Accordingly, the actual clamping interference retained by the yoke can be expressed, $(D-d_0) - 0.012 = 0.088$ mm., with the result that it has been found that its frictional force will amount to about 10–12 kilograms which has been determined by means of a known torsion gage. Thus, it will achieve a mechanically adequate retaining power and an impact resistance to withstand shock. 0.012 mm. is one-tenth of $\alpha(=0.12$ mm.). FIG. 6 shows the top plan view of the finished article assembled in accordance with the principle of the invention in which the frame including the backing-plate 3 and the magnet 2 are firmly mounted within the yoke 4 with a minimum center deviation. As described hereinabove, the improved assembling method of the invention is chiefly directed to the manufacture of popular articles by making a small and compact part for instruments, but should not be limited as such. It will be apparent that various changes may be made in the form, construction and arrangement of the parts without departing from the spirit and scope of the invention, the form hereinbefore described being merely a preferred embodiment thereof.

I claim:

1. In a method of mounting a centrally disposed center magnet mounted in a frame in which a moving coil is rotatably mounted within a substantially cylindrical metallic yoke by inserting said frame into said yoke, the improvement comprising the steps of exerting a predetermined amount of pressure on said yoke in a direction perpendicular to the axis of said yoke to cause said yoke to be deformed into an oval, maintaining said deformed condition for a predetermined interval, inserting a frame having a length greater than the normal inside diameter of said yoke into said yoke with the frame extending in the direction of the longer diameter of the oval yoke, and releasing said pressure to tighten said frame within said yoke by means of the force inherent in the metallic material of said yoke within the limit of its elasticity.

2. The method as claimed in claim 1 wherein said yoke is a magnetic metallic material having a relatively little permanent distortion, a relatively strong force tending to return it to its original shape, and a high magnetic permeability.

3. The method as claimed in claim 1 wherein said yoke is substantially of a pure iron in its working hardened state.

4. The method as claimed in claim 1 wherein said center magnet is a permanent magnet.

5. The method as claimed in claim 1 wherein said center magnet is a sintered oxide magnet.

6. In a method of mounting a centrally disposed center magnet mounted in a frame in which a moving coil is rotatably mounted within a substantially cylindrical metallic yoke by inserting said frame into said yoke, the improvement comprising the steps of exerting a predetermined amount of pressure on said yoke in a direction perpendicular to the axis of said yoke to cause said yoke to be deformed into an oval to an extent such that the permanent distortion of the yoke when the pressure is released does not exceed a predetermined amount, while said yoke is maintained in the deformed condition inserting a frame having a length slightly greater than the longer dimension of the yoke after it has been permanently distorted into the yoke with the length of the frame in the direction of the longer dimension of the deformed yoke, and releasing said pressure on said yoke to clamp the frame within the yoke by means of the force inherent in the metallic material of the yoke tending to return it to its normal shape.

References Cited

UNITED STATES PATENTS

| 1,901,197 | 3/1933 | Simpson | 324—151 |
| 3,068,551 | 12/1962 | Cobb | 29—453 |

OTHER REFERENCES

AIEE Miscellaneous Paper 49–162, "A New Instrument Mechanism," May 1949.

JOHN F. CAMPBELL, *Primary Examiner.*

W. L. CARLSON, *Examiner.*

R. V. ROLINEC, *Assistant Examiner.*